No. 767,234. Patented August 9, 1904.

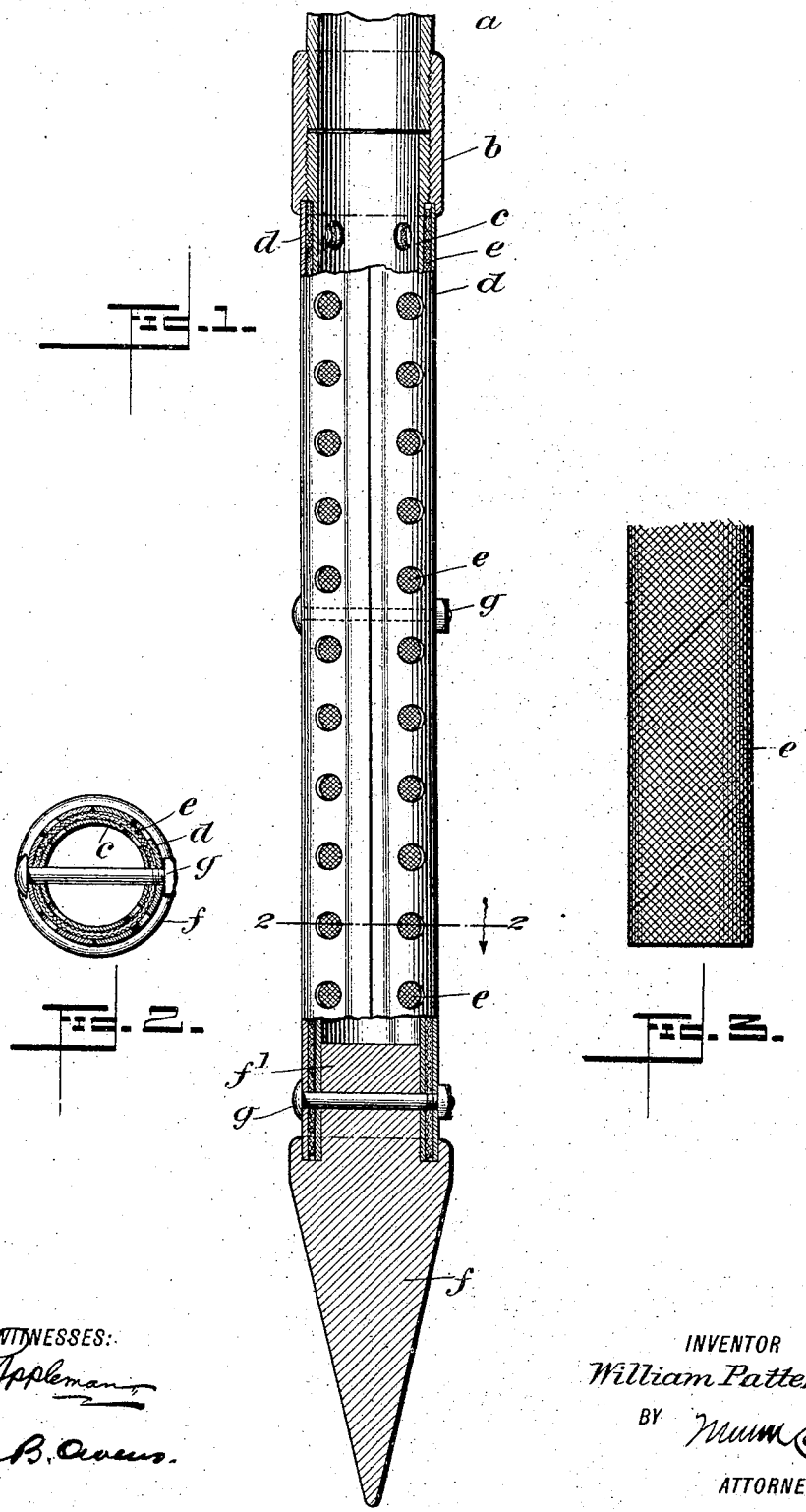

UNITED STATES PATENT OFFICE.

WILLIAM PATTERSON, OF CENTRAL CITY, NEBRASKA.

WELL-POINT.

SPECIFICATION forming part of Letters Patent No. 767,234, dated August 9, 1904.

Application filed January 18, 1904. Serial No. 189,493. (No model.)

*To all whom it may concern:*

Be it known that I, WILLIAM PATTERSON, a citizen of the United States, and a resident of Central City, in the county of Merrick and State of Nebraska, have invented a new and Improved Well-Point, of which the following is a full, clear, and exact description.

This invention relates to a point and strainer for driven-well tubes.

The principal objects of the invention are to increase the strength of the strainer part of the device, to so arrange the parts that the screen may be easily reached for repair or renewal, and to obtain a free flow of water through the well-point. In attaining these ends I wrap one or a plurality of layers of screen spirally around the inner perforated tube, thus getting far greater strength than is attained in the usual arrangement in which the screen is put on square, and I form the outer perforated tube in two or more longitudinal sections suitably yet removably fastened in place, and by this arrangement I can readily reach the screen for repair or other purposes.

The invention involves other features of major or minor importance, and all will be fully set forth hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention with parts broken away and in section. Fig. 2 is a cross-section thereof on the line 2 2 of Fig. 1; and Fig. 3 is an elevation of the screen, showing its spiral disposition.

$a$ indicates the main part of the well-tube, and $b$ any suitable coupling to the strainer.

$c$ indicates the inner perforated tube of the strainer, and $d$ the outer perforated tube, the outer tube being formed in two or more longitudinal sections, as illustrated, so that it may be readily applied to or removed from the strainer. Between these tubes is arranged a screen $e$, which is formed of a strip of wire or other equivalent fabric wound spirally around the inner tube $c$ in the manner indicated in Fig. 3. Preferably I provide two layers of this woven-wire fabric. By this arrangement the strength of the screening and of the entire strainer is greatly increased, enabling it to stand the pressure necessary in the operation of the well-tube, as will be understood, and by means of the removable sections of the outer tube $d$ said tube may be removed at any time so as to repair or replace the screen.

$f$ indicates the point of the drill, having the reduced portion $f'$ fitted in the lower part of the strainer, and $g$ indicates bolts or other suitable means for holding the various parts together.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A well-tube strainer, comprising the combination of the inner perforated tube, a screening inclosing the same, and a perforated, sectional outer tube removably secured over the screening.

2. A well-tube strainer comprising an outer perforated tube formed in longitudinal sections, means for removably holding said sections in place, and a spirally-wound screen in said tube.

In testimony whereof I have signed my name to this specification in the presence of two subscribing witnesses.

WILLIAM PATTERSON.

Witnesses:
   CHAS. C. McENDREE,
   WM. McENDREE.